United States Patent
Sakai

(10) Patent No.: US 7,526,641 B2
(45) Date of Patent: Apr. 28, 2009

(54) IPSEC COMMUNICATION METHOD, COMMUNICATION CONTROL APPARATUS, AND NETWORK CAMERA

(75) Inventor: Junichi Sakai, Tokyo (JP)

(73) Assignee: Panasonic Corporation, Osaka (JP)

( * ) Notice: Subject to any disclaimer, the term of this patent is extended or adjusted under 35 U.S.C. 154(b) by 835 days.

(21) Appl. No.: 11/074,714

(22) Filed: Mar. 9, 2005

(65) Prior Publication Data

US 2006/0031922 A1 Feb. 9, 2006

(30) Foreign Application Priority Data

Aug. 4, 2004 (JP) .............................. 2004-228582

(51) Int. Cl.
*H04L 9/00* (2006.01)
(52) U.S. Cl. ........................ 713/151; 713/160; 713/162; 726/1
(58) Field of Classification Search ........................ None
See application file for complete search history.

(56) References Cited

U.S. PATENT DOCUMENTS 6,728,713 B1 * 4/2004 Beach et al. .................. 707/10
6,782,474 B1 * 8/2004 Ylonen ........................ 713/162
6,799,212 B1 9/2004 Iyoki
2002/0188871 A1 * 12/2002 Noehring et al. ............. 713/201

FOREIGN PATENT DOCUMENTS

JP 2003-259175 9/2003

OTHER PUBLICATIONS

English Language Abstract of JP 2003-259175.
IETF RFC2401, "Security Architecture for the Internet Protocol."
IETF RFC2409, "The Internet Key Exchange."

* cited by examiner

*Primary Examiner*—Jung Kim
(74) *Attorney, Agent, or Firm*—Greenblum & Bernstein, P.L.C.

(57) ABSTRACT

When a packet arrives from a communication terminal apparatus, i.e., a communicating terminal with which the IPsec communication is performed, a source IP address is recognized from an IP header of the packet and a security policy is registered in an SPD. At the same time, an encoding parameter for the encoded communication with the communicating terminal is registered in an SAD. When an SA entry is deleted from the SAD, the security policy for the communicating terminal is deleted from the SPD, as long as there is no other entry that is referring to the security policy corresponding to the deleted SA entry.

5 Claims, 8 Drawing Sheets

Fig. 3

| Item | Value set in camera |
|---|---|
| Local IP address | IP address of camera |
| Remote IP address | Source IP address of the arrived IP packet |
| Protocol | TCP |
| Source port number | ANY |
| Destinatior port number | 80 |
| Pre-shared key | Value set from setting screen |

Fig. 4

| Item |
|---|
| Local IP address |
| Remote IP address |
| Encoding algorithm |
| Encoding key |
| Authentication algorithm |
| Authentication key |
| Lifetime |

Fig.7

| Item | Value set in camera |
|---|---|
| Local IP address | IP address of camera |
| Remote IP address | Source IP address of the arrived IP packet |
| Protocol | TCP |
| Source port number | ANY |
| Destinatior port number | 80 |
| Pre-shared key | Value set from setting screen |
| Lifetime | Infinity/Limited time |

IPSEC COMMUNICATION METHOD, COMMUNICATION CONTROL APPARATUS, AND NETWORK CAMERA

BACKGROUND OF THE INVENTION

1. Field of the Invention

The present invention relates to an IPsec communication method, a communication control apparatus, and a network camera that perform encoded communication via an IP network.

2. Description of Related Art

In recent years, a network camera has been developed that can connect to an IP (Internet Protocol) network, in a proposed system where image and video data captured by such a network camera can be viewed by a communication terminal apparatus, such as a computer. In this network camera system, the communication terminal apparatus accesses the network camera by using an installed browser and receives the captured image data by using the HTTP (HyperText Transfer Protocol).

Related Art 1 describes an example of a network camera that can be used in the above network camera system. In the network camera system, non-interlaced frame image data and field image data are generated from interlaced image data output by the network camera, in order to output a high quality image data that is distributed to a client via the network.

The conventional network camera system has the following shortcomings. Since an unspecified number of users can access the camera, the security of the data can be compromised. In particular, a communication terminal apparatus connected to the IP network and having a browser installed can easily access the network camera system. However, depending on the location of the network camera, the distribution destination of the captured image needs to be limited to a certain kind of users (e.g., registered users).

As a technology that reinforces the security of the captured image distribution from the network camera, via the IP network, an IPsec (Security Architecture for IP) communication protocol can be introduced, the protocol performing encoding and authentication of an IP packet. The IPsec is a protocol regulated by the RFC (Request For Comment) technically specified by the IETF (Internet Engineering Task Force) (see Publication 1). Using the IPsec enables authentication to prevent alteration of data within the IP packet, and encodes the data in the IP packet.

[Related Art 1] Japanese Patent Laid Open Publication 2003-259175

[Publication 1] IETF RFC2401 "Security Architecture for the Internet Protocol"

When performing data communication using the IPsec, a data source (i.e., network camera, when transmitting image data from a network camera to a communication terminal apparatus) needs to have a security policy database (SPD) and security association database (SAD), the SPD registering information that indicates to which destination the encoded communication is performed (security policy), the SAD registering data including a parameter that indicates the encoded contents of the encoded communication for each security policy in the SPD. When there is a data transmission request from a communication terminal apparatus whose IP address is not registered in the SPD (terminal that does not have a permission from the security policy to communicate), the network camera (data source) can ignore the transmission request from the communication terminal apparatus.

An IP address for the communication terminal apparatus (data destination) can be dynamically assigned by the DHCP (Dynamic Host Configuration Protocol). Therefore, the IP address is not always fixed. In such a case, the security using the IPsec cannot be enforced, since the IP addresses for terminals having the permission for the IPsec communication cannot be registered in advance, in the SPD and SAD of the network camera.

The IPsec communication is still possible by temporarily obtaining an IP address from the communication terminal apparatus and registering the same in the SAD and SPD of the camera. However, when the IP address is no longer used by the communication terminal apparatus at a later stage, such an entry which will not be used in the future can be left in the SPD of the camera, thereby straining the memory space.

SUMMARY OF THE INVENTION

The present invention addresses the above-described problems. The purpose of the invention is to provide an IPsec communication method, a communication control apparatus, and a network camera that performs IPsec communication. In the IPsec communication, a source IP address is registered in an SPD as one of the security policies indicating to which destination encoded communication is performed, the source IP address being recognized from a packet received from the destination (communicating terminal for the encoded communication). At the same time, an encoding parameter for the encoded communication with the communicating terminal is registered in an SAD. When the communicating terminal no longer uses the IP address stored in the SPD, the security policy for the communicating terminal is automatically deleted from the SPD.

In the present invention, when a packet arrives from a communicating terminal (with which the IPsec communication is performed), a source IP address is recognized from an IP header of the packet and registered in an SPD. At the same time, an encoding parameter for the encoded communication with the communicating terminal is registered in an SAD. When the communicating terminal no longer uses the IP address stored in the SPD, the security policy for the communicating terminal is deleted from the SPD.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 illustrates a configuration of a security policy database according to the embodiment of the present invention;

FIG. 4 illustrates a configuration of a security association database according to the embodiment of the present invention;

FIG. 7 illustrates another security policy database according to the embodiment of the present invention.

DETAILED DESCRIPTION OF PREFERRED EMBODIMENTS

The embodiments of the present invention are explained in the following, in reference to the above-described drawings.

Figure 1:
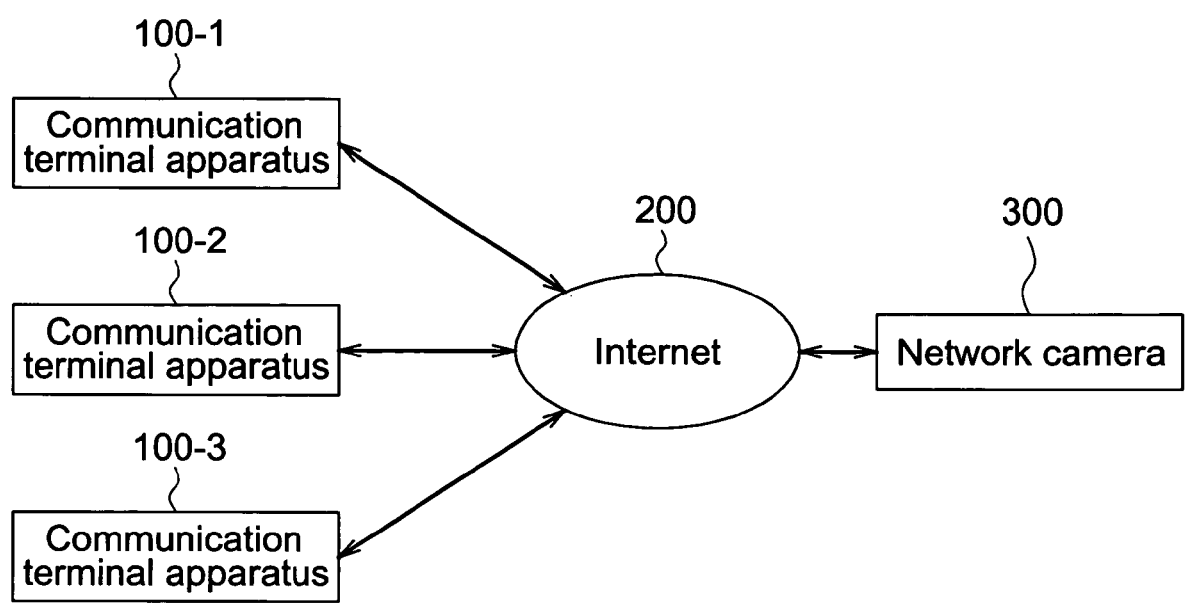
FIG. 1 illustrates an example of a configuration of a network camera system according to an embodiment of the present invention.

FIG. 1 illustrates an example of a configuration of a network camera system according to an embodiment of the present invention. In FIG. 1, communication terminal apparatuses 100-1 through 100-3 can be connected to network camera 300 via Internet 200. Communication terminal apparatuses 100-1 through 100-3 have IP addresses dynamically assigned to themselves by the DHCP. It is highly unlikely that the same (fixed) IP address will be assigned after a communication is terminated.

Communication terminal apparatuses 100-1 through 100-3 transmit an HTTP command requesting an image data transmission from network camera 300. When the source (sender) of the HTTP command is registered as a valid user, network camera 300 encodes the captured image data and transmits the data.

In this embodiment, as a key exchange method (IKE: Internet Key Exchange) for encoding image data, network camera 300 employs a main mode/pre-shared authentication method specified under IETF RFC2409 "The Internet Key Exchange (IKE)".

Figure 2:
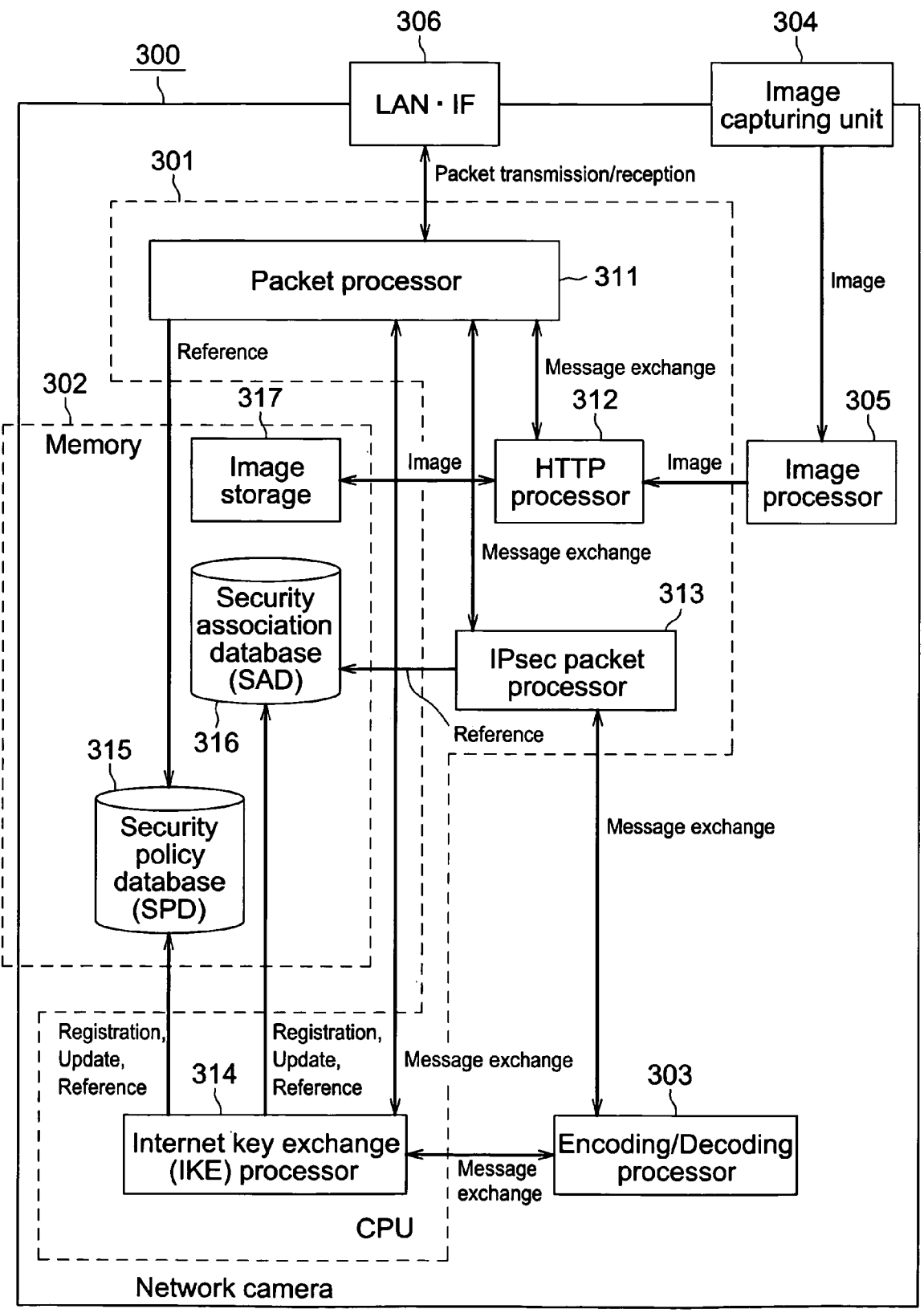
FIG. 2 is a block diagram illustrating a configuration of a network camera according to the embodiment of the present invention.

FIG. 2 is a block diagram illustrating a configuration of network camera 300 according to the embodiment of the present invention. As shown in FIG. 2, network camera 300 mainly includes CPU 301 that can perform IPsec communication and has the IKE (Internet Key Exchange) function; memory 302 that is configured with ROM/RAM or the like and stores the SPD and SAD; encoding/decoding processor 303 that performs encoding and decoding; image capturing unit 304 that converts a video image captured by a camera lens into an electrical image signal; image processor 305 that processes the image signal output from image capturing unit 304; and LAN interface 306 that functions as a network interface.

CPU 301 retrieves and executes various programs stored in memory 302, in order to enable functions for packet processor 311, HTTP processor 312, IPsec packet processor 313, IKE processor 314, etc. Packet processor 311 determines a type of a received packet. When the received packet is an IPsec packet that is encoded by a shared key between one of communication terminal apparatuses 100-1 through 100-3 (source) and network camera 300, the packet is output to IPsec packet processor 313. When the received packet is an IKE packet (to be used for IKE) or an authentication packet, the packet is output to IKE processor 314. Packet processor 311 outputs an HTTP command to HTTP processor 312, the command being selected from the decoded IPsec packet and including various control commands. Further, packet processor 311 converts the image data into a packet and outputs the encoded IPsec packet to LAN interface 306.

When an encoded IPsec packet is output from packet processor 311, IPsec packet processor 313 controls encoding/decoding processor 303 to decode the IPsec packet. When an un-encoded IPsec packet is output from packet processor 311, IPsec packet processor 313 controls encoding/decoding processor 303 to encode the IPsec packet.

According to the control by IPsec packet processor 313, encoding/decoding processor 303 retrieves, via IKE processor 314, the shared key corresponding to one of communication terminal apparatuses 100-1 through 100-3 (communicating terminal) from SPD 315 and performs decoding of an IPsec packet or encoding of a packet.

Prior to the encoded IPsec packet communication, IKE processor 314 negotiates with one of communication terminal apparatuses 100-1 through 100-3 (communicating terminal) to set the shared key. In particular, IKE processor 314 recognizes one of communication terminal apparatuses 100-1 through 100-3 (source of the IKE packet and authentication packet) as a valid user and registers a security policy of one of communication terminal apparatuses 100-1 through 100-3 in SPD 315. At the same time, IKE processor 314 registers an entry in SAD 316, the entry having information such as encoding parameter for the encoded communication with the communicating terminal and an IP address of the communicating terminal. Additionally, IKE processor 314 deletes an entry for each communicating terminal from SAD 316, according to an algorithm described later, and deletes, from SPD 315, a security policy that will not be used for the encoded communication with the same IP address at a later stage.

According to the HTTP command included in the decoded IPsec packet, HTTP processor 312 obtains the image data from image processor 305 or image storage 317. In addition, according to an operator's input from an input section (not shown in the figure), HTTP processor 312 registers and updates the pre-shared key for the use in SPD 315. In this embodiment, the pre-shared key is an authentication key that is preset between one of communication terminal apparatuses 100-1 through 100-3 and network camera 300. A different key is set for each of communication terminal apparatuses 100-1 through 100-3.

Memory 302 has SPD 315 and SAD 316.

FIG. 3 illustrates an example of an entry of a security policy that is registered in SPD 315. Each entry shown in FIG. 3 is stored for each communicating terminal. The security policy registered in SPD 315 includes a local IP address (IP address of network camera 300), remote IP address (global IP address of a communication terminal apparatus, i.e., communicating terminal), protocol, source port number, destination port number, and pre-shared key. The remote IP address is an address that is retrieved from the source IP address included in the IP packet, the packet arriving from the communicating terminal for the encoded communication. The method for obtaining the address is later described.

FIG. 4 is an example of an encoded method entry that is registered in SAD 316. The entry for SAD 316 includes a local IP address (address of network camera 300), remote IP address (address of the communication terminal apparatus, i.e., communicating terminal), encoding algorithm, encoding key, authentication algorithm, authentication key, and lifetime. The lifetime is time set for updating the encoded information. The shorter the lifetime is, the higher the security level can become.

Image processor 305 controls image capturing unit 304 of the camera according to an HTTP command sent from HTTP processor 312, and converts a captured image (obtained from image capturing unit 304) into digital image data. Image storage 317 stores the image data obtained by image processor 305.

Figure 5:
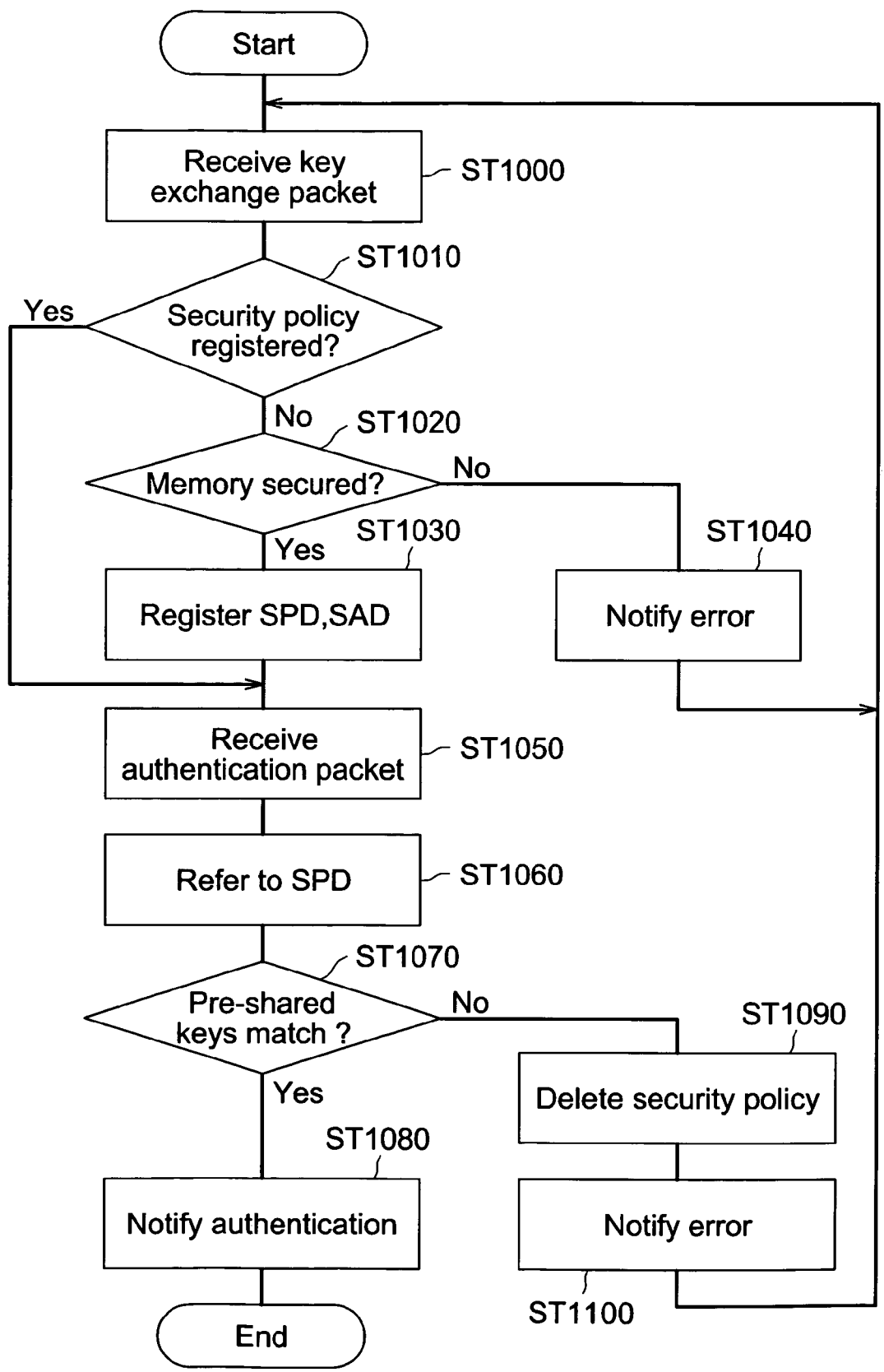
FIG. 5 is a flowchart illustrating a key exchange operation of the network camera according to the embodiment of the present invention.

The following describes an IKE operation by network camera 300 having the above-described configuration, referring to a flowchart in FIG. 5.

In the following description, communication terminal apparatus 100-1 and network camera 300 performs the key exchange.

First, when LAN interface 306 receives an IKE packet (ST 1000), the IKE packet is output to IKE processor 314 via packet processor 311. The IKE packet includes encoding methods such as encoding algorithm and authentication algorithm.

When the IKE packet is output to IKE processor 314, IKE processor 314 refers to SPD 315 to determine whether the source IP address of the IKE packet is already registered (ST 1010). In particular, it is checked whether the source IP address of the IKE packet (remote IP address of communication terminal apparatus 100-1) is registered as a valid user of network camera 300.

When it is determined that communication terminal apparatus 100-1 is already registered as a valid user, IKE processor 314 waits for a transmission, from communication terminal apparatus 100-1, of an authentication packet including a pre-shared key.

When it is determined that communication terminal apparatus 100-1 is not registered as a valid user at ST1010, it is determined whether it is possible to secure a memory area in SPD 315 that registers the security policy having the remote IP address of communication terminal apparatus 100-1 as the communicating terminal (ST 1020). When it is determined that the memory area does not have enough capacity to secure the data, an error message is transmitted back to communication terminal apparatus 100-1 to notify the failure of security policy registration (ST 1040). When it is possible to secure the memory area, the security policy is registered in SPD 315, the policy having the source IP address (described in the IP header of the IKE packet) as the communicating terminal. At the same time, an entry is registered in SAD 316, the entry including encoding parameter and the communicating terminal's IP address for performing the IPsec communication with the communicating terminal (ST 1030). In particular, a security policy entry having the items shown in FIG. 3 is added to SPD 315. The source IP address described in the IP header of the IKE packet is copied to the remote IP address. In addition, information such as encoding algorithm, authentication algorithm, lifetime is retrieved from the IPsec header of the IKE packet, and the entry having items shown in FIG. 4 is registered in SAD 316.

Since the remote IP address of communication terminal apparatus 100-1 is registered as the security policy, it is possible to easily register the security policy, even when the IP address of the communication terminal apparatus 100-1 is dynamically assigned by the DHCP. This is because the IKE packet is transmitted from communication terminal apparatus 100-1 when the remote IP address is changed.

A pre-shared key is associated with each security policy registered in SPD 315. As described above, the pre-shared key is input by the operator using the input section (not shown in the figure) and registered in SPD 315 via HTTP processor 312.

When the security policy of communication terminal apparatus 100-1 is registered in SPD 315 (or when the security policy is already registered), IKE processor 314 waits for the reception of an authentication packet. Upon receiving the authentication packet from communication terminal apparatus 100-1 via LAN interface 306 (ST 1050), the authentication packet is output to IKE processor 314 via packet processor 311. The authentication packet includes a pre-shared key of communication terminal apparatus 100-1, the key being registered in SPD 315.

When the authentication packet is output to IKE processor 314, IKE processor 314 refers to SPD 315 (ST 1060) to determine whether the pre-shared key included in authentication packet and the pre-shared key (of communication terminal apparatus 100-1) registered in SPD 315 match (ST 1070).

When the pre-shared keys match, it is recognized that the source of the authentication packet is communication terminal apparatus 100-1 registered in SPD 315. Then, an authentication notification is transmitted back to communication terminal apparatus 100-1 (ST 1080). After network camera 300 thusly authenticates the communicating terminal as a valid user (i.e., communication terminal apparatus 100-1 registered in SPD 315) necessary information is exchanged for the IPsec communication.

When the pre-shared keys do not match at ST 1070, it is determined that the source of the authentication packet is not communication terminal apparatus 100-1 registered in SPD 315. Thus, the security policy entry of communication terminal apparatus 100-1 is deleted from SPD 315, and the corresponding entry is deleted from SAD 316 (ST 1090). Then, an error message is transmitted to the source of the authentication packet to notify that the security policy has been deleted (ST 1100).

Accordingly, network camera 300 securely authenticates communication terminal apparatus 100-1 as the communicating terminal. Therefore, information can be exchanged using the IPsec communication that demands a higher security level.

In the above explanation, the security policy of communication terminal apparatus 100-1 is deleted at ST 1090 when the pre-shared keys do not match. However, it is possible to have a configuration where a re-transmission request for the pre-shared key can be made to the source of the authentication packet for a predetermined number of times, for example, and the security policy of communication terminal apparatus 100-1 can be deleted when the pre-shared key registered in SPD 315 is still not received after the number of retransmission requests.

Accordingly, it is possible to avoid unnecessary procedures and to securely authenticate the communicating terminal, even when a wrong pre-shared key is included in the authentication packet by error.

When the IPsec communication becomes possible, communication terminal apparatus 100-1 converts an HTTP command into an IPsec packet, the command requesting image data. Then, communication terminal apparatus 100-1 encodes the IPsec packet and transmits the packet to network camera 300. When the IPsec packet is received by LAN interface 306 of network camera 300, encoding/decoding processor 303 decodes the packet under the control of IPsec packet processor 313. At this time, encoding/decoding processor 303 receives a security policy (e.g., encoding algorithm of communication terminal apparatus 100-1) from SAD 316 via IKE processor 314 in order to decode the data in relation to the encoding performed by communication terminal apparatus 100-1.

The obtained HTTP command after the decoding process is output to HTTP processor 312 via packet processor 311, and the image data is obtained by HTTP processor 312 from image processor 305 or image storage 317. When the HTTP command is requesting real-time video image data, for example, HTTP processor 312 directly obtains the video image data from image processor 305. When the HTIP command is requesting a previously-captured still image data, for example, HTTP processor 312 obtains the still image data stored in image storage 317.

The obtained data is first converted into a packet by packet processor 311, then encoded, by IPsec packet processor 313 and encoding/decoding processor 303, using the encoding algorithm corresponding to communication terminal apparatus 100-1, thereby converting the data into an IPsec packet to be transmitted via packet processor 311 and LAN interface 306.

As described above, since the image data and the command requesting the image data are communicated as IPsec packets, it is possible to perform communication having the high security level.

Figure 6:
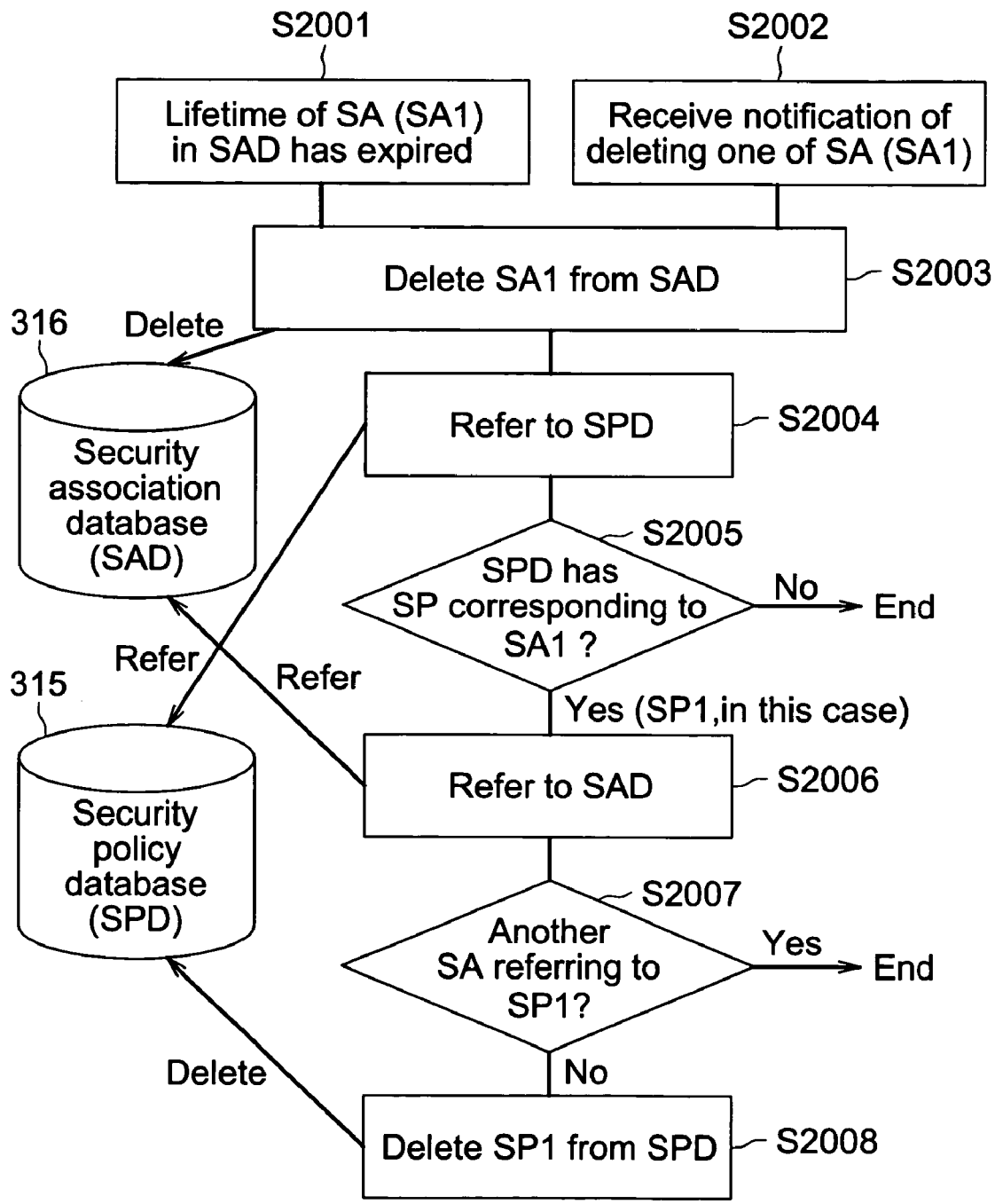
FIG. 6 is a flowchart illustrating an operation that deletes a policy from the network camera according to the embodiment of the present invention.

The following illustrates an operation of IKE processor 314 that deletes the security policy from SPD 315, using a flowchart shown in FIG. 6.

FIG. 6 is a flowchart illustrating a deletion of a security policy from SPD 315. During IPsec communication, encoded communication using a predetermined encoding method is performed with a communicating terminal. After a predetermined time period, the encoding parameter (e.g., encoding algorithm, encoding key) for the encoded communication with the communicating terminal is changed. The timing for the change of encoding parameter is given by the lifetime of an SA entry, which is registered for each communicating terminal in SAD 316. In addition, there is a case where the communicating terminal requests for a change of encoding key. For example, receiving a deletion notification of an SA entry (registered in SAD 316) from the communicating terminal will prompt a deletion of the corresponding SA entry.

As shown in FIG. 6, when the lifetime within the SA entry (registered in SAD 316) expires (S2001), or when a deletion notification is received (S2002), the corresponding entry (SA1) is deleted from SAD 316 (S2003).

When the IPsec communication is maintained even after deleting entry SA1 from SAD 316, a new entry having the same remote IP address (updating the encoding parameter) is generated and registered in SAD 316. However, when the session is terminated by completing the communication with the communicating terminal, a new SA entry having the same remote IP address will not be generated. Therefore, there is a situation where a security policy is registered in SPD 315 but the entry is not found in SAD 316 for the communicating terminal. In other words, the security policy in SPD 315 is no longer used.

In this embodiment, when there is no possibility that the security policy registered in SPD 315 will be used, the policy is deleted from SPD 315.

In particular, When entry SA1 of the communicating terminal is deleted from SAD 316 at S2003, it is determined whether an SP entry of the security policy is found in SPD 315, the entry having the same remote IP address previously registered in (and deleted from) entry SA1 (S2004 and S2005). Since the communicating terminal registered in SAD 316 has the corresponding security policy in SPD 315, an error signal is generated when a corresponding SP entry is not found in SA1 at S2005. When the SP corresponding to SA1 (=SP1) is found, it is determined whether an SA referring to SP1 is found in SAD 316 (S2006 and S2007). For example, if an SA entry having the same remote IP address is registered, it is determined that the SA entry is referring to SP1. In this case, SP1 is not deleted because it is considered that the encoded communication is maintained as described above. When an SA entry having the same remote IP address is not registered in SAD 316, the corresponding SP1 (the security policy having the same remote IP address) is deleted from SPD 315 (S2008).

Accordingly, the security policy for the IPsec communication with the potential communicating terminal (to perform encoded communication) is sequentially registered in SPD 315. At the same time, when an entry (SA1) is deleted from SAD 316, the entry having information such as an encoding parameter, the corresponding security policy registered in SPD 315 (SP1) is deleted, provided that there is no other SA entry referring to the security policy. Therefore, it is possible to prevent an adverse situation where the number of security policies will keep increasing in SPD 315.

The method for deleting the security policy (SP) registered in SPD 315 is not limited to the above description. For example, a security policy can include a lifetime item as shown in FIG. 7, so that by controlling the lifetime value, the security policy can be deleted upon the expiration of the lifetime.

Figure 8:
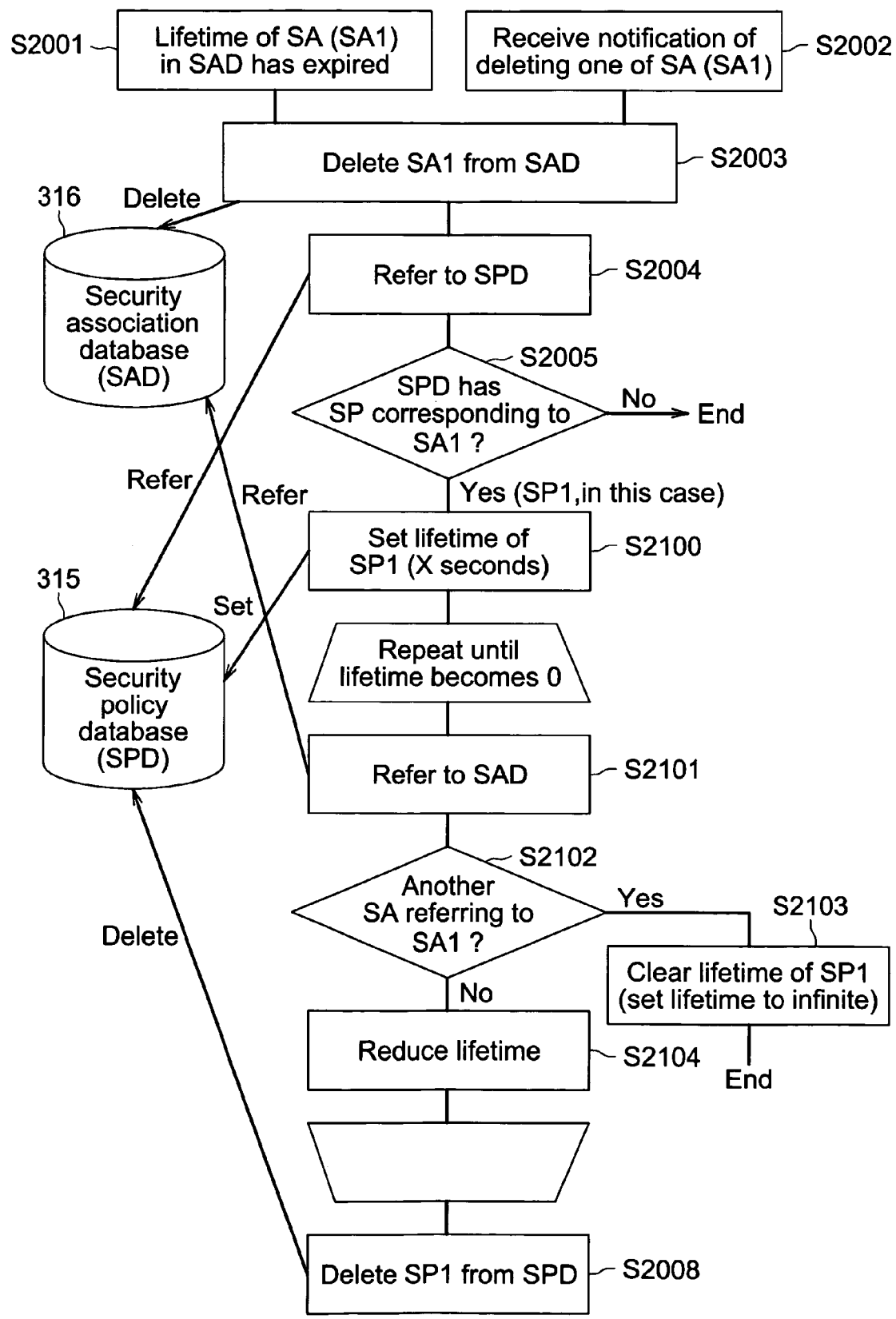
FIG. 8 is a flowchart illustrating another key exchange operation of the network camera according to the embodiment of the present invention.

FIG. 8 is a flowchart illustrating a method that includes a lifetime item in the security policy and deletes the security policy. S2001 through S2005 are the same steps described in the flowchart shown in FIG. 6. When SP1 corresponding to SA1 is found in SPD 315 at S2005, time (X seconds) is set in lifetime of SP1 (S2100). Then, SAD 316 is referred to (S2101) to determine whether there is another SA entry referring to SP1 (S2102). When such an SA entry referring to SP1 is found, the lifetime is cleared (set to infinity) (S2103). When there is no other SA entry, the lifetime is decreased (S2104). Until lifetime of SP1 becomes 0, S2101 through S2104 are repeated, When the lifetime of SP1 becomes 0, SP1 is deleted from SPD 315 (S2008).

This embodiment is illustrated using a situation where an communication terminal apparatus obtains image data of a network camera. However, the present invention is not limited to the above example. For example, the present invention can be applied to a database server, where a plurality of communication terminal apparatuses access a shared data source through an IP network.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-228582 filed on Aug. 4, 2004, entire content of which is expressly incorporated by reference herein.

What is claimed is:

1. A communication control apparatus comprising:
   a security policy database that stores a security policy for each communicating terminal with which an encoded communication is performed;

a security association database that stores an entry including an encoding parameter for each communicating terminal;

a storage unit that stores a security policy in said security policy database using a source IP address of a reception packet; and a policy deletion unit that determines, when an entry for a communicating terminal is deleted from said security association database, whether a security policy for the communicating terminal is effective and deletes the security policy when the security policy is determined not to be effective, wherein, when an entry is deleted from said security association database, said policy deletion unit sets a time limit in a lifetime included in a security policy corresponding to the entry, decreases the time limit as time passes as long as there is no other entry referring to the security policy, and deletes a security policy from said security policy database when the lifetime becomes 0, and when an entry is deleted from said security association database and another entry is referring to a security policy corresponding to the deleted entry, said policy deletion unit sets the lifetime to infinity.

2. The communication control apparatus according to claim 1, wherein, when an entry is deleted from said security association database, said policy deletion unit deletes, from said security policy database, a security policy corresponding to the entry as long as there is no other entry referring to the security policy.

3. An IPsec communication method that performs IPsec communication using a security policy database and a security association database, the security policy database storing a security policy for each communicating terminal with which an encoded communication is performed, the security association database storing an entry including an encoding parameter for each communicating terminal, the method comprising:

storing a security policy in the security policy database using a source IP address of a reception packet;

determining, when an entry for a communicating terminal is deleted from the security association database, whether a security policy for the communicating terminal is effective;

deleting the security policy when the security policy is determined not to be effective, when an entry is deleted from said security association database, setting a time limit in a lifetime included in a security policy corresponding to the entry;

decreasing the time limit as time passes as long as there is no other entry referring to the security policy;

deleting the security policy from said security policy database when the lifetime becomes 0; and when an entry is deleted from said security association database and another entry is referring to a security policy corresponding to the deleted entry, setting the lifetime to infinity.

4. The IPsec communication method according to claim 3 further comprising:

deleting, when an entry is deleted from the security association database, a security policy corresponding to the entry from the security policy database as long as there is no other entry referring to the security policy.

5. A network camera comprising:

an image capturer that inputs an image;

a transmitter that converts the image into an IP packet and transmits the packet to a network; and the communication control apparatus according to claim 1, wherein, the image is transmitted to a communicating terminal as encoded communication performed by said communication control apparatus.

* * * * *